(12) United States Patent
Mavromatis et al.

(10) Patent No.: US 9,171,228 B2
(45) Date of Patent: Oct. 27, 2015

(54) METHOD AND SYSTEM FOR ESTIMATING A SIMILARITY BETWEEN TWO BINARY IMAGES

(75) Inventors: Constantin Mavromatis, Marseilles (FR); Christophe Palmann, Marseilles (FR); Jean Sequeira, Roquevaire (FR)

(73) Assignees: UNIVERSITE D' AIX-MARSEILLE, Marseilles (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 120 days.

(21) Appl. No.: 14/002,518

(22) PCT Filed: Mar. 2, 2012

(86) PCT No.: PCT/FR2012/050438
§ 371 (c)(1),
(2), (4) Date: Sep. 18, 2013

(87) PCT Pub. No.: WO2012/117210
PCT Pub. Date: Sep. 7, 2012

(65) Prior Publication Data
US 2014/0044362 A1 Feb. 13, 2014

(30) Foreign Application Priority Data
Mar. 2, 2011 (FR) ...................................... 11 51710

(51) Int. Cl.
*G06K 9/00* (2006.01)
*G06K 9/62* (2006.01)
*G06T 7/00* (2006.01)

(52) U.S. Cl.
CPC ............ *G06K 9/6202* (2013.01); *G06T 7/0028* (2013.01); *G06T 2207/10032* (2013.01); *G06T 2207/20221* (2013.01); *G06T 2207/30181* (2013.01)

(58) Field of Classification Search
None
See application file for complete search history.

(56) References Cited

U.S. PATENT DOCUMENTS

| 2002/0054210 | A1* | 5/2002 | Glier et al. ..................... 348/149 |
| 2004/0228502 | A1* | 11/2004 | Bradley et al. ................ 382/100 |
| 2009/0316240 | A1* | 12/2009 | Hara ................................ 359/33 |
| 2010/0322522 | A1* | 12/2010 | Wang et al. .................... 382/218 |

OTHER PUBLICATIONS

International Search Report (PCT/ISA/210) mailed on Aug. 14, 2012, by the French Patent Office as the International Searching Authority for International Application No. PCT/FR2012/050438.
Written Opinion (PCT/ISA/237) mailed on Aug. 14, 2012, by the French Patent Office as the International Searching Authority for International Application No. PCT/FR2012/050438.
Palmann et al., "A new approach for registering remote sensing images from various modalities", Proceedings of SPIE, Jan. 2009, vol. 7477, pp. 74770C-1 to 74770C-11, XP055004186.

(Continued)

*Primary Examiner* — Hadi Akhavannik
(74) *Attorney, Agent, or Firm* — Buchanan Ingersoll & Rooney PC

(57) ABSTRACT

The invention relates to a method and a system for estimating the resemblance between two images of optionally different modalities. More particularly, the invention makes it possible to characterize a similarity between two binary images according to a formula that allows registration of images acquired in the fields of teledetection, medical imaging, and industrial vision.

14 Claims, 4 Drawing Sheets

(56) References Cited

OTHER PUBLICATIONS

Shams et al., "Image Registration in Hough Space Using Gradient of Images", 9$^{th}$ Biennial Conference of the Australian Pattern Recognition Society on Digital Image Computing Techniques and Applications, Dec. 2007, pp. 226-232, XP055004590.

Shams et al., "Gradient Intensity: A New Mutual Information-Based Registration Method", IEEE Conference on Computer Vision and Pattern Recognition, Jun. 2007, pp. 1-18, XP031114655.

Gottesfeld, "A Survey of Image Registration Techniques", ACM Computing Surveys, Dec. 1992, pp. 325-376, XP002942558.

* cited by examiner

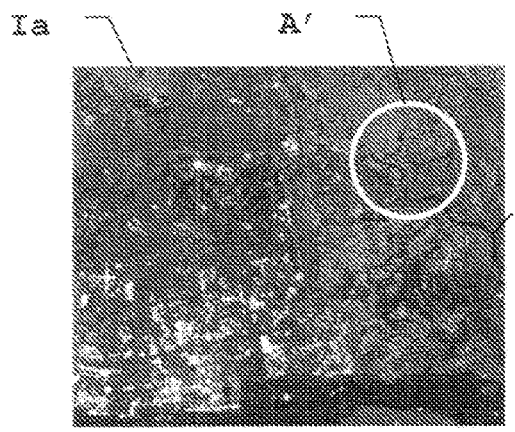
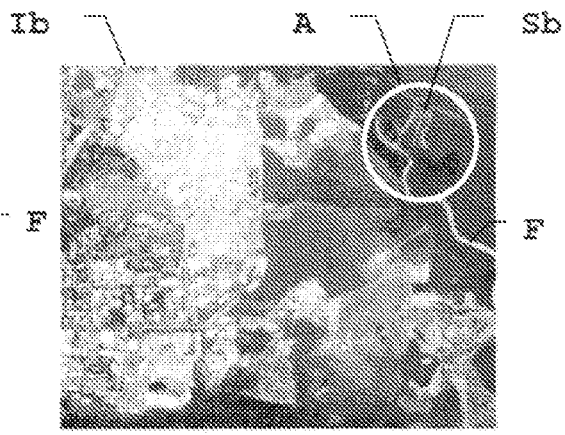
FIG.1a
FIG.1b
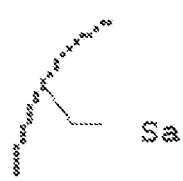
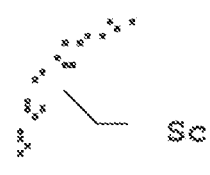
FIG.2a
FIG.2c
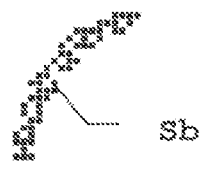
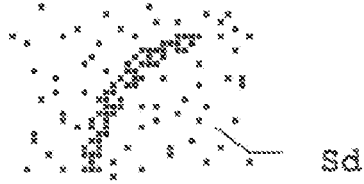
FIG.2b
FIG.2d

METHOD AND SYSTEM FOR ESTIMATING A SIMILARITY BETWEEN TWO BINARY IMAGES

The invention relates to a method and associated system for estimating the resemblance between two images optionally with different modalities. More particularly, the invention makes it possible to characterize a similarity between two binary images.

An image conveys a significant quantity of information. It is thus and for example possible to use images acquired at different moments to assess the evolution of a particular piece of information. These images are generally of the same modality.

The term "modality" refers to a physical characterization associated with a data capture. Thus, two images with different modalities contain different pieces of information and are often supported by different representations. For example, the pixels of a radar image are represented by complex numbers that correspond to the response to an emitted wave, said response in turn depending on parameters related to said wave. The pixels of a multispectral optical image are alternatively vectors—having as many components as there are bands—whereof each component represents the emission of light in a given frequency band.

In remote sensing, it is essentially radar images or multispectral images that are manipulated. In medical imaging, images coming from scanners or Nuclear Magnetic Resonance imaging devices are used. In industrial vision applications, it is common practice to use visible images or infrared images. Irrespective of the modality of the concerned images, to assess the evolution of a piece of information, it is generally necessary to recalibrate the images, i.e., to match them through a geometric transformation that makes it possible to determine, for each pixel of a first image, the pixel of a second image to which it corresponds.

The problem of recalibrating images of the same modality has been widely studied. Solutions are currently in use or published, although their respective effectiveness and precision vary. Examples of these solutions in particular include the ICP (Iterated Closest Point) and RANSAC (RANdom Sample Consensus) methods, which process any matching of two clouds of points.

The ICP-type methods are based on an iterative pairing-estimation process: the points of the first cloud are paired with those of the second cloud according to a spatial proximity criterion, then all of the pairs thus produced make it possible to estimate a transformation. However, the process does not make it possible to differentiate between what is shared by the two clouds and what is not. These methods of course converge—sometimes at the expense of a large number of iterations—but to a large extent integrate noise in the determination of the matching. They therefore lack precision. Consequently, all image recalibrations using the obtained estimates are relatively imprecise.

RANSAC-type methods make it possible to highlight outliers, but do not always converge. Generally, these stochastic methods consist of evaluating a quantity of recalibrations of clouds of points done by randomly drawn geometric transformations. More specifically, these methods generally consist of an iterative process that seeks to estimate local transformations connecting small numbers of pairs of points drawn randomly. Contrary to ICP methods, these methods succeed in discriminating shared information. However, to maximize the likelihood of estimating the desired transformation, it is necessary to estimate a large number of local transformations, in particular if the quantity of information shared between two clouds is small. These methods are therefore relatively ineffective when the shared information portion is small relative to the noise. However, this is clearly the case in the field of remote sensing in particular.

Other techniques further exist for measuring the similarity of clouds of points: for example, geometric invariants. According to these techniques, the objects are no longer simple points, but are described in a complex manner, the description not depending on the desired type of geometric transformation. To that end, it is necessary to formalize such objects. The latter then acquire the status of "primitive". It is further necessary to define a metric for measuring the resemblance of two primitives. In general, the geometric invariants must satisfy different constraints to be able to be used correctly. Aside from the invariants relative to the desired type of transformation, the primitives must meet criteria of uniqueness (two different primitives must have different descriptions), stability (if a primitive is slightly deformed, then its description is only slightly modified), independence (understood as meaning of the components that form the description vector). The use of these techniques further requires that said primitives be uniformly distributed in the clouds, and still more difficult, that the primitives be able to be extracted irrespective of the available capture means and irrespective of the capture conditions of the studied scene. In practice, it is nearly impossible to meet all of the imposed constraints.

The problem of recalibrating images with different modalities remains particularly open and sensitive. In fact, there is no known method or system making it possible to assess a similarity or to perform a recalibration of images when the latter have different modalities. The main pitfall lies in the fact that it is difficult to compare the content of pixels that refer to different entities.

Improving the recalibration of images with different modalities is of major interest in particular in the field of remote sensing, where many satellites, or even satellite constellations, have been—or will soon be—launched, each satellite having sensors of different natures. It is therefore desirable to be able to integrate the information extracted from each of these data sources into the same model, which requires prior recalibration.

In the field of remote sensing, there is also a general interest in a particular entity designated on a monitor allowing the display of a first image with a given modality. An effort is then made to find that entity in a set of available images, regardless of their respective modalities, even when said entity does not explicitly appear within other images. This analysis currently requires manual, even tedious processing, or the estimates resulting from that processing are relatively imprecise or contradictory.

The invention makes it possible to respond to all of the drawbacks raised by the known solutions. It in particular makes it possible to precisely quantify the resemblance between a region of an image of a first modality and a region of a second image independent of its modality. The implementation of the invention makes it possible to automate the analysis of multiple images using an analysis system suitable for that purpose. The invention is furthermore particularly high-performing to estimate the resemblance between two images of a same modality.

To that end, a method is provided for characterizing a similarity between two binary images, said method being carried out by a processing unit of a system for analyzing similarities of images further including storage means cooperating with said processing unit to store binary images. According to the invention, the method includes a step for extracting a first set of primitives from a first binary image and a second set of primitives from a second binary image, the first and second binary images being stored beforehand by the system. Each primitive is associated with a pixel of a binary image and is characterized by the position of said pixel and by the orientation of an orientation line passing through the latter. Such a method further includes a step for measuring the presence of a common piece of information within said binary images and delivering a similarity indicator $\epsilon^*$ therefor, said indicator being calculated by the processing unit as the relative deviation between an overall maximum H and the average of two other local maximums H' and H", i.e., $$\epsilon^* = \frac{|H - \tilde{H}|}{2} \text{ where } \tilde{H} = \frac{H' + H''}{2},$$

said maximums being determined from a distribution of the different orientations of pairs of primitives respectively resulting from two extracted sets of primitives.

According to one preferred embodiment, the extraction step may consist of:
  obtaining a binary image stored by the system;
  applying a plurality of binary masks to each pixel making up said binary image, the binary masks each consisting of an orientation line whereof the thickness and orientation are predetermined and which describes a diameter of a circular window whereof the radius is also predetermined;
  counting, for each binary mask applied to a pixel—called referring pixel—, the number of pixels adjacent to said referring pixel that are covered by said binary mask;
  defining, then storing as primitive associated with a referring pixel, a triplet $P((x,y)\theta,s)$ comprising the position (x,y) of the referring pixel in the binary image; the largest number s, called the score, of adjacent pixels covered by one of the binary masks applied to the referring pixel; as well as the orientation $\theta$ of the orientation line of said binary mask.

To avoid considering isolated points or insignificant areas of a binary image, the invention provides that a primitive may only be stored if its score is greater than or equal to a predetermined minimum number $s_{min}$.

Furthermore, to improve the robustness of the method for a given noise level, the invention provides that only the primitives whereof the referring pixels are distant by a minimum and predetermined number of pixels $D_{min}$ can be stored.

To optimize the calculation times for the calculations done by the processing unit, or even to maximize the likelihood of identifying a piece of information shared by two binary images, the measurement step carried out by the processing unit may preferably consist of:
  determining a region of predetermined size in the first and second binary images to thus form a pair of regions;
  counting and storing the occurrences of the different orientations for all pairs of primitives respectively extracted from said pair of regions;
  calculating the similarity indicator $\epsilon^*$ between the two regions of the pair.

Optionally, a method according to the invention may include a prior step for associating and storing said first and second binary images, respectively, with two images stored or acquired by the image similarity analysis system.

According to one embodiment, a method according to the invention may further include a step for recalibrating two stored or acquired images or even identifying a remarkable element located in the two images from the calculated similarity indicator $\epsilon^*$. In that case, such a method may include a step for displaying said recalibrated images and/or the remarkable element using a man-machine interface suitable for the image similarity analysis system.

According to a second subject-matter, the invention relates to a system for analyzing the similarity of binary images including a processing unit cooperating with storage means, said processing unit implementing a method for characterizing a similarity between two binary images according to the invention.

According to a third subject-matter, the invention relates to a system for recalibrating acquired or stored images. Such a system includes means for storing and/or acquiring images, said means cooperating with a processing unit, which in turn further cooperates with storage means for implementing the method—according to the invention—making it possible to recalibrate two stored or acquired images or even to identify a remarkable element located in the two images from the calculated similarity indicator $\epsilon^*$.

The processing unit of such a system may additionally deliver the two recalibrated images or the identified remarkable image to a man-machine interface.

To communicate the similarity measurement to an operator, whatever the system according to the invention, the latter may further include a man-machine interface for delivering the similarity indicator $\epsilon^*$.

Furthermore, to increase its interactivity, the processing unit of a system according to the invention may include a man-machine interface for selecting one image from among several and/or a particular region thereof.

Other features and advantages will appear more clearly upon reading the following description and examining the accompanying figures, in which:

FIGS. 1a and 1b respectively show two images of different modalities;

FIGS. 2a to 2d describe linear structures of a binary image;

FIGS. 3a to 3d describe different configurations of a binary mask making it possible to extract, according to the invention, a primitive from a binary image;

FIG. 4 describes the application of a binary mask according to one embodiment of the invention;

FIG. 5 illustrates the steps for extracting a primitive according to one preferred embodiment of the invention;

FIG. 6 describes an example of matching primitives respectively extracted from regions of two binary images;

Figure 3A:
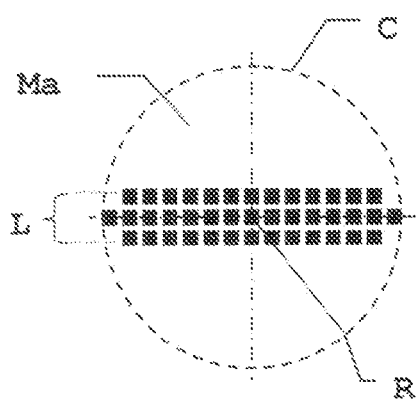
Figure 3B:
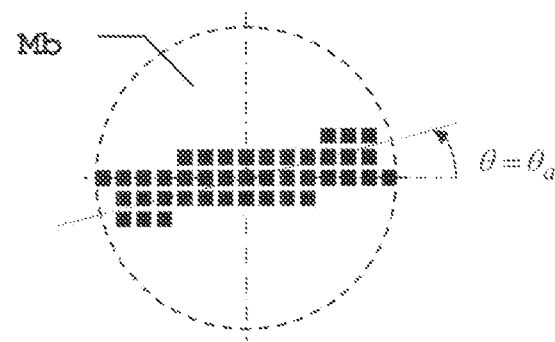
Figure 3C:
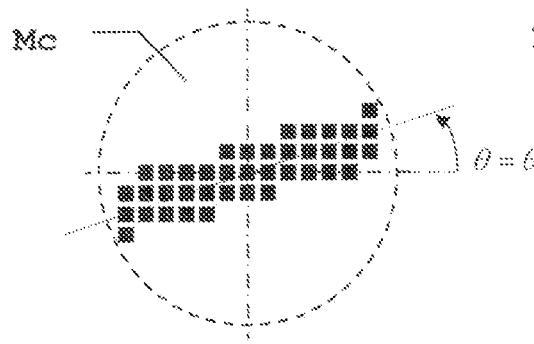
Figure 3D:
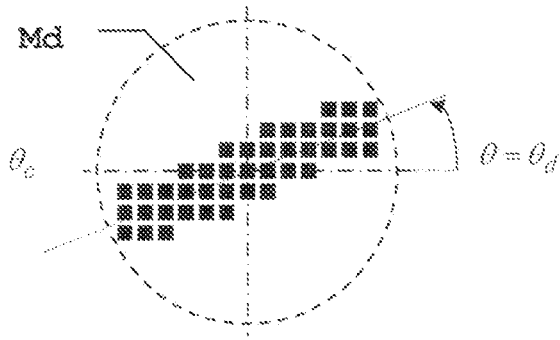

FIGS. 1a and 1b respectively describe a radar image 1a and an optical image 1b. These figures illustrate a first example embodiment of the invention. The images 1a and 1b correspond to a same geographical zone. The latter information may for example be deduced from their respective acquisition parameters. Nevertheless, two images never match perfectly. This can be seen through the two images 1a and 1b described in connection with FIGS. 1a and 1b. It is therefore necessary to recalibrate said images to be able to compare what is comparable, i.e., to match the pixels of the two images to the same entities. For example, in the image 1b, it is possible to visually detect, in the top right (region A—above the river F—embodied by a white circle in FIG. 1b), a structure S that does not appear in the image 1a. The corresponding region A' in the latter nevertheless contains complementary information that may be important for the operator. The invention allows the automatic and precise location, on the image 1a, of the analogue A' of the region A previously identified in the image 1b. By extension, and insofar as the method for estimating the similarity according to the invention is carried out completely automatically by a fitting system, this method may be applied to all images—regardless of their respective modalities—corresponding to that geographical zone. It is for example possible to designate a region of interest (for example the structure S previously mentioned in the image Ib) on a first image, and an analysis system according to the invention can automatically go through a satellite image bank to extract all images therefrom having close localization parameters. A region corresponding to said region of interest may then be embodied or designated in each image.

The implementation of the invention presumes a prior step that consists of associating each image with a binary image in the form of a cloud of points.

The image subsequently makes it possible to estimate the similarity between two binary images, or even to perform a recalibration thereof.

A priori, no shared information exists regarding the content of the matching pixels in two images, in particular if they are of any different modalities. The only link between the two images is formed by the actual medium (geographic for remote sensing) of the data. According to the invention, it is not relevant to take an interest in the information contained in each pixel, but rather in the distribution of the relevant information (whatever it may be) in those images.

To associate a binary image with an image, various methods exist that are generally respectively dedicated to a particular modality. A binary image is in a way the expression of a relevant piece of information present in an image in the form of points.

A radar image is often noisy. This type of noise is generally referred to as "speckle", or "tavelure" or "chatoiement" in French. For example, to associate a binary image with a radar image, it is known to use the Touzi filter to segment the image. Thresholding the segmented image makes it possible to obtain a binary image having edge points of visible regions on said image.

The pixels of the multispectral image do not express a scalar value, but express a set of scalar values (as many as there are bands). Said pixels are therefore represented by a vector in a space whereof the dimension is the number of bands. Another manner of approaching this representation problem consists of considering that one has not a multispectral image, but as many scalar images (called "gray level") as there are bands and which one wishes to reset to produce a scalar image that would be the best possible recomposition or, at the very least, that which integrates the maximum amount of information from the scalar images associated with each band. To achieve this result, it is for example known to consider a vectorial space with dimension $\phi$ ($\phi$ being the number of bands) of the centered values of the pixels (considered to be vectors) of the multispectral image. It is then for example possible to carry out a Principal Component Analysis of this cloud of points where each point is a vector associated with each pixel. A "Principal Direction" (associated with the largest unique value) is then obtained that corresponds to the best linear combination of the $\phi$ initial bands. The result produces a "gray level" image that may be processed with filtering, variation detection (passage by zero of the Laplacian, for example) and thresholding operators to produce a binary image.

Other techniques may be implemented to associate an image of a given modality with a binary image.

Once this prior step is carried out, the invention makes it possible to assess the resemblance between two binary images in the form of clouds of points through an invariant measurement by rigid transformation and scale change. The invariance relative to this type of transformation is particularly interesting, as the invention may respond to most recalibration situations between satellite images of different modalities in particular.

The implementation of a method according to the invention, by a processing unit of a suitable analysis system, consists of seeking, a rigid transformation (translation and rotation), if one exists, that best matches two clouds of points, and assessing the level of information shared by those two clouds of points.

Irrespective of the modality of an image, the points resulting from the associated binary image are based on a physical support whereof the characteristics are linear. In the field of remote sensing, these linear characteristics for example result from riverbanks, field edges, or coasts, or road edges, etc. Locally, the structures may be well marked, or may be noisy, or may even have lacunar aspects.

As an example, FIGS. 2a to 2d illustrates typical linear structures that may be encountered in particular in the field of remote sensing.

Thus, FIG. 2a describes a linear structure Sa—substantially in the shape of an arc of circle—that is ideal or perfect: fine, without artifact or intersection with other linear structures.

FIGS. 2b to 2d illustrate more realistic situations. Thus, FIG. 2b shows a thicker structure Sb than the previous one that may be interpreted as an ambiguous localization structure.

FIG. 2c describes an unconnected structure, even though the organization of the points appears visually obvious. FIG. 2d describes a fixed structure surrounded by points resulting from noises that may be interpreted as false positives.

One preferred implementation of the invention is based on the "Hough Transform", which consists of looking for the possible occurrences of transformations causing certain subsets of points of the first binary image to match other subsets of points of the second binary image. The Hough space is then a space with three dimensions that are the parameters of the transformation, namely the angle of rotation and the two components of the translation.

Applying the Hough transform even though a small quantity of information may be shared between two binary images makes it very sensitive to noise, and its use may quickly prove ineffective.

To avoid this drawback, the invention consists of introducing a structuring element—or knowledge element—that reflects the structure of a binary image, but in no way restricts the use of the method.

Thus, one subject-matter of the invention consists of defining a primitive making it possible to depict, in a unified and equivalent manner, all of the local distribution possibilities of points associated with linear structures as described as examples by FIGS. 2a to 2d. These primitives, once extracted, will for example make it possible to perform an automatic recalibration.

A primitive according to the invention "naturally" eliminates the aberrant points and treats the structure of the clouds of points homogenously. Such a primitive may correspond to a local cloud of points comparable to a small curve arc characterized by its position (x and y coordinates) in the image, its orientation $\theta$ and its relevance or score s. Such a primitive P is denoted $P=((x,y)\theta,s)$.

To characterize a similarity between two binary images, a method according to the invention includes a step for respectively extracting a plurality of primitives from each binary image.

To extract the primitives from a binary image, the invention provides a preferred embodiment in which a plurality of binary masks is defined in the form of a circular window C comprising a straight line segment L (or orientation line) whereof the line thickness El is predetermined and expressed in number of pixels. FIGS. 3a to 3d respectively describe such a mask. Thus, FIG. 3a describes a circular window C, with radius R including a line L. The radius R thus defines the vicinity around a referring point, center of the circular window C. The thickness El of the orientation line L corresponds to a threshold over the Euclidean distance between an element and the discrete line connecting two ends of a discrete circle. For FIGS. 3a to 3d, the thickness El is equal to 1, i.e., a central edge plus two edges on either side. The radius R is equal to 7. The total number of elements for each mask depends on the radius R and the thickness El as well as the orientation $\theta$ of the orientation line, $\theta \in [0°, 180°]$. FIGS. 3a to 3d describe examples of masks Ma, Mb, Mc and Md, respectively, for which the radius R is equal to 7, the thickness El is equal to 1 and the orientation $\theta$ varies by 0° for FIG. 3a, at $\theta=\theta_b$ for FIG. 3b, at $\theta=\theta_c$ for FIG. 3c and at $\theta=\theta_d$ for FIG. 3d. Thus, the number of elements is 41 for the mask Ma described by FIGS. 3a and 39 for the mask Md described relative to FIG. 3d.

Figure 4:
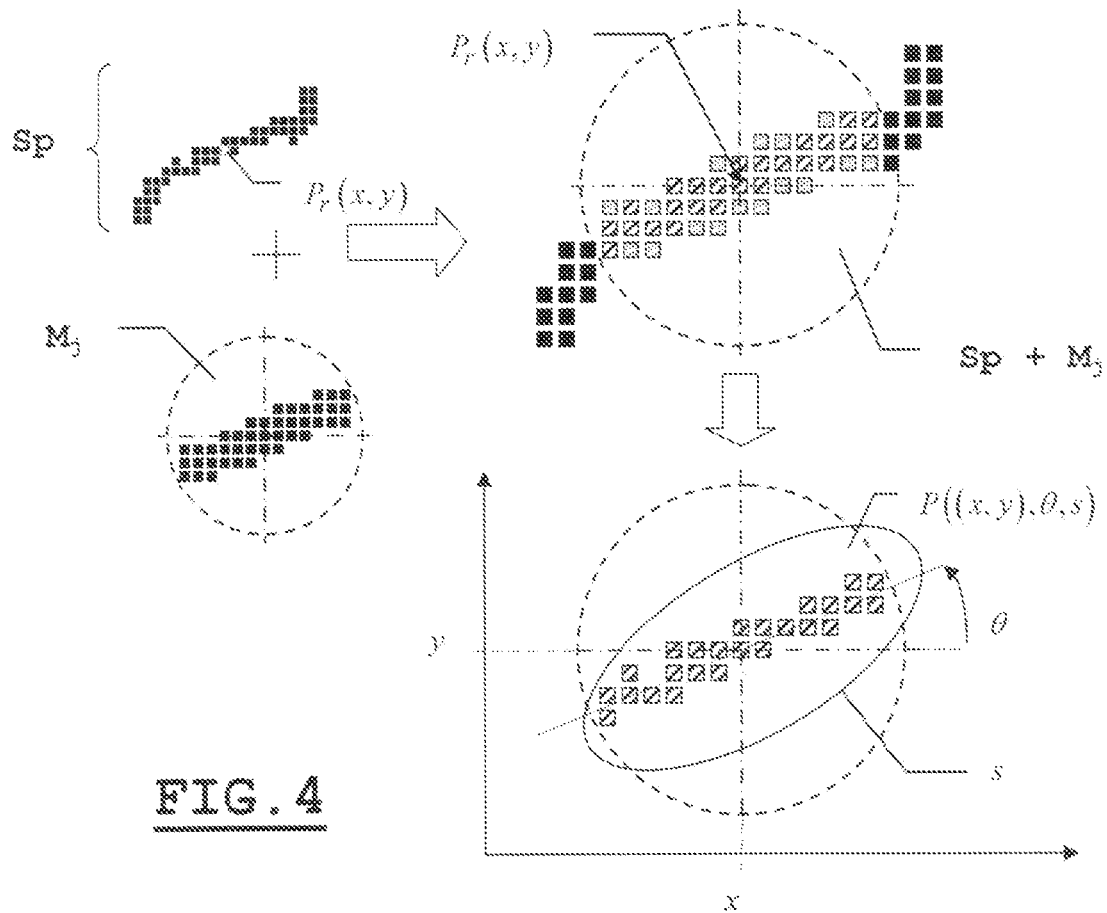

To extract the primitives from a binary image, a system according to the invention successively applies each of the n' available binary masks for each point of the cloud of the binary image. As illustrated in FIG. 4, each mask is centered on a referring point $P_r(x,y)$ whereof the coordinates x and y determine the position within the binary image.

The point $P_r$ belongs to a piece Sp of a linear structure. The application of the binary mask $M_j$ consists of counting the points of Sp situated in the vicinity of $P_r$ that intercept the elements of the mask $M_j$ (j comprised between 1 and n'). Thus, in FIG. 4, the set Sp+$M_j$ indicates, in black, the points of Sp that are not covered by the mask $M_j$. The elements of the mask not intercepted by the points of Sp are indicated by squares with a gray texture. The points of Sp that intercept the elements of $M_j$ are shown by crosshatched squares. It is the latter that are counted by the processing unit of a system according to the invention to determine whether the orientation line of the mask is relevant in light of the linear structure to which a referring point belongs. The mask that counts the most elements intercepted by the structure determines the best orientation line. The processing unit thus extracts a primitive $P=((x,y),\theta,s)$ associated with the referring point $P_r$ determined by the coordinates (x,y) of said referring point, the orientation $\theta$ of the orientation line of the mask and the number s of intercepted elements. The best orientation line associated with a referring point of a linear structure substantially constitutes the equivalent of the tangent at that point. To further improve the precision of the selected orientation $\theta$, the invention provides that it is for example possible to perform a Principal Component Analysis applied on the pixels having been intercepted by the best mask. The primitive is then in turn characterized by said discrete orientation thus obtained. The orientations $\theta$ can then assume a number n of discrete values greater than the number n' of available binary masks.

A system according to the invention thus determines, for any point of the binary image, the primitive having collected the best score s.

Figure 5:
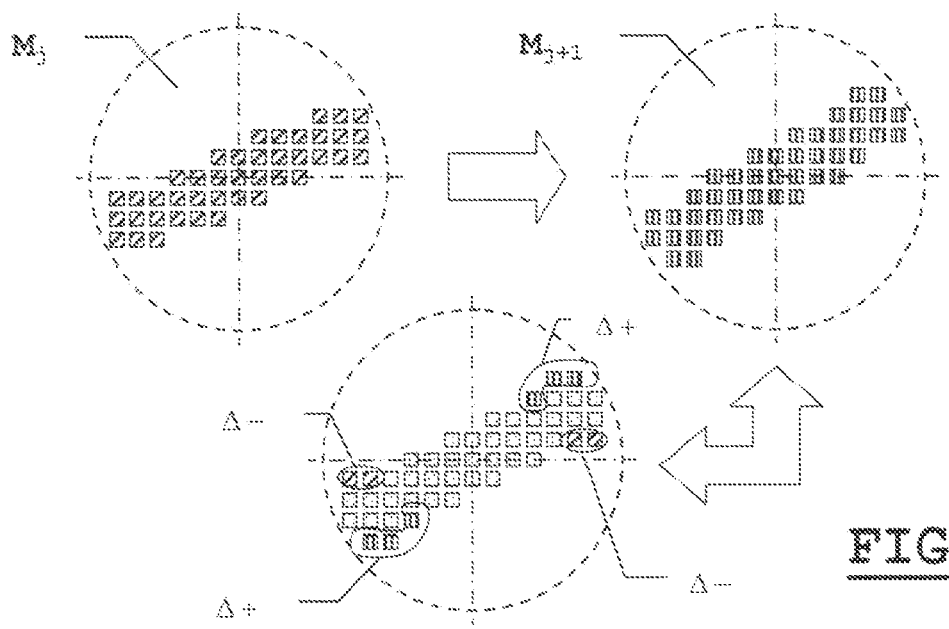

To be able to optimize the calculation time of the processing unit of such a system, the invention provides a preferred embodiment of the step for extracting primitives. This embodiment is described relative to FIG. 5. The counting of the respective elements of the set of binary masks may only require a single passage over the entire circular window. In fact, the counting of a mask may be deduced from that of the previous mask, iteratively, by only testing the added elements and the deleted elements to go from one mask to the next. Thus, according to FIG. 5, the elements of a mask $M_j$ are shown using crosshatched squares. The elements of the following mask $M_{j+1}$ are shown by squares with vertical lines. The view at the bottom of FIG. 5 describes the elements shared by the two masks using gray squares, the elements $\Delta+$ added by the mask $M_{j+1}$ using squares with vertical lines and the deleted elements $\Delta-$ using crosshatched squares. According to this embodiment, the score of the mask $M_{j+1}$ is then defined by the score of the mask $M_j$ to which said elements $\Delta+$ are added that are intercepted by the linear structure covered by the window and from which the elements $\Delta-$ also intercepted are deleted. The gain in complexity is thus estimated at approximately 60%.

The invention also provides that only the primitives having a score above or equal to a threshold $S_{min}$ can be kept and stored. This alternative makes it possible to avoid having to consider isolated points or insignificant areas of the binary image.

The invention also provides that a system according to the invention can account for a parameter corresponding to a minimum distance $D_{min}$ between two extracted primitives. In other words, only the primitives having obtained the best score s from among those associated with referring points situated at a distance at least equal to $D_{min}$ can be kept and stored by such a system. This minimum distance is a parameter of the process for extracting the primitives from a binary image according to the invention, for a given robustness and a given noise level.

Whatever the favored embodiment, the invention translates a cloud of points into a set of uniformly distributed primitives characterizing the presence and local orientation of underlying linear structures.

A system for estimating the similarity using the method according to the invention includes means for storing at least two sets of primitives respectively relative to two binary images.

Consider two binary images A and B and the sets Qa and Qb of primitives respectively extracted from said binary images. A single rigid transformation (translation, then rotation) associating Qa with Qb exists. Let $t_x$, $t_y$ and $\alpha$ be the parameters making it possible to go from Qa to Qb. In fact, said transformation lies in the composition of a rotation by an angle $\alpha$ and a translation in the plane $(t_x, t_y)$. According to the principle of the Hough transform, the sets of parameters (each set corresponding to an occurrence of the rigid transformation) accumulate in a dimension 3 space that is the Hough space.

The equations connecting the respective coordinates ($z_a$ and $z_b$) and orientations ($\theta_a$ and $\theta_b$) of two primitives coming from two binary images A and B to the parameters of the rigid transformation are expressed in complex notation by the relationship:

$Z_a = e^{j\alpha} \cdot z_b + t$ where the complex number $t = t_x + i \cdot t_y$ represents the translation in the plane and $\alpha = \theta_a - \theta_b$.

Figure 6:
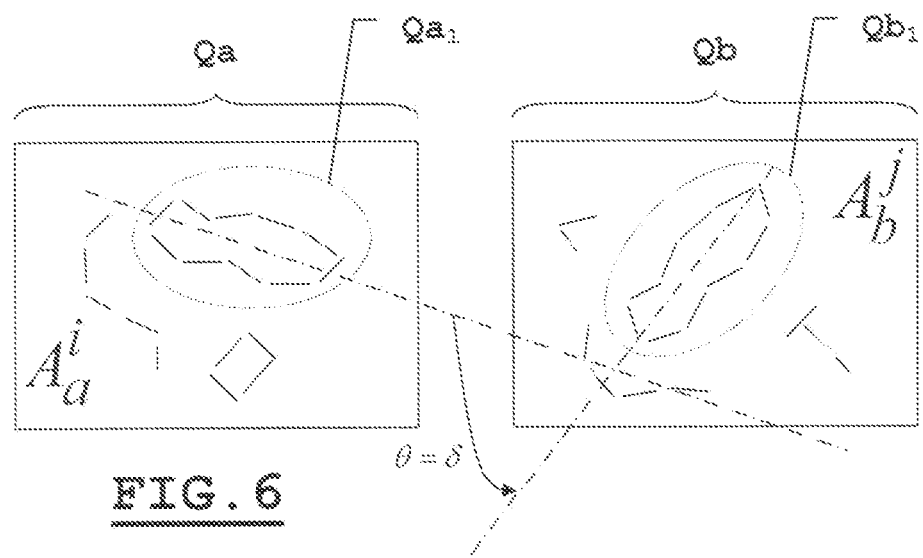

The implementation of the invention now consists not of seeking the value $\alpha$ that would correspond to the angle of rotation of the transformation, but of seeking whether, considering two regions (one $A_a^i$ in an image A and the other $A_b^j$ in the other image B as described as an example in FIG. 6), and taking all pairs of primitives of those two images, a signal (a particular value of $\alpha$) does or does not emerge. This processing may alternatively be done by the processing unit of a system according to the invention on all of the binary images.

If a signal emerges, this means that the implementation of a method according to the invention has detected the existence of a subset of primitives of the first window that is found in the second window to within a rotation by an angle α.

The emergence of the signal that will characterize the presence of shared information between two windows concretely corresponds to the presence of a maximum marked in the distribution of the different orientations.

According to the invention, the parameters favoring the emergence of this signal, or on the contrary those which favor the presence of false positives, which correspond to maximums unfavorably formed by matches of irrelevant primitives, are primarily the number of primitives in each region (or binary image), the number of discrete orientations that can be attributed to some primitives, and the contamination rate, which corresponds to the ratio of the number of primitives with no match out of the number of primitives in each region.

Thus, when the number of primitives k increases, the emergence of the relevant signal that characterizes shared information is favored. The same is true when the number n of discrete orientations that can be attributed to the primitives increases.

On the other hand, when the proportion ϵ of primitives between two regions or images with no match, also called "contamination rate", increases, the emergence of false positives is favored.

To guarantee the robustness of the characterization of shared information between two regions, it suffices to invert a risk equation r(ϵ,k,n) such that:

$$r(\varepsilon, k, n) = e^{\left((1-\varepsilon)\cdot k + \frac{k^2}{n}\right) \cdot \log\left(\frac{k^2}{n \cdot \left((1-\varepsilon)\cdot k + \frac{k^2}{n}\right)}\right) + (1-\varepsilon)\cdot k}$$

Thus, by positing r(ϵ0,k,n)=p0, where ϵ0 corresponds to an arbitrarily large contamination rate (management of unfavorable situations) and where p0 corresponds to an arbitrarily low risk of appearance of false positives (robustness), it is possible to identify the appropriate number n of discrete orientations based on the number of primitives k. Thus, it is possible to parameterize the analysis system according to the invention to monitor the precision of the orientations of primitives and therefore the reliability of the characterization of shared information between two regions of two binary images.

To describe one embodiment of the step of a method for measuring the presence of shared information within binary images by counting occurrences of differences of orientations of pairs of primitives respectively extracted from the two binary images, let us consider two regions of images $A_a^i$ and $A_b^j$ as presented by FIG. 6.

This figure illustrates two regions and $A_a^j$ and $A_b^j$ for which two sets of primitives Qa and Qb have been extracted. This illustration also illustrates the existence of two subsets of primitives $Qa_1$ and $Qb_1$ that appear to match and whereof the orientations are shifted by a value δ, i.e., the discretized value of α relative to the degree of precision of the orientations of primitives, i.e., the discrete value closest to the angle of rotation a that exists between the two binary images.

FIG. 6 describes the translation of two clouds of points that partially match through a rigid transformation. This transformation can also consist of a change of scale (scale factor), since the latter does not influence the difference of the angles.

To characterize the emergence of the sought signal, a method according to the invention integrates the following constraints:
  the possibility that a "conspiracy" of the noise exists to form local maximums that would hinder the identification of a relevant maximum;
  the possibility that a certain variability exists in the differences of orientation of matching primitives, and that the sought signal is not perfectly localized.

Figure 7:
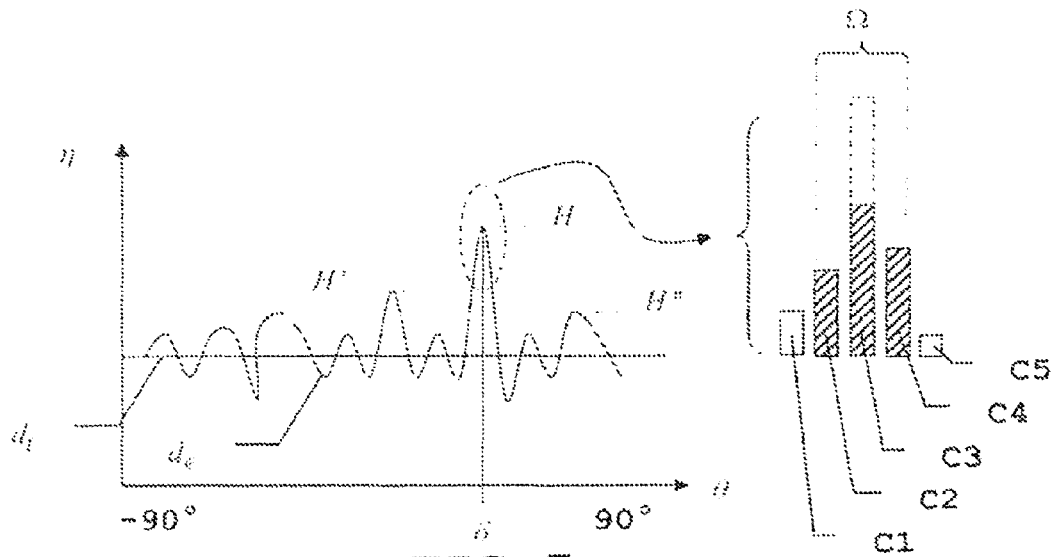
FIG. 7 illustrates an example of the determination of maximums of a distribution of differences of orientations of primitives to develop a similarity indicator according to the invention.

Said FIG. 7 makes it possible to describe one example of the formation of occurrences η in the Hough space making it possible to characterize information shared between two regions. In theory, the distribution of the occurrences for any θ should have a quasi-uniform distribution $d_r$ of the Dirac type clearly identifying the signal δ. The reality generally produces an experimental distribution $d_e$ that may give rise to the emergence of local maximums H' and H" characterizing false positives that may hinder the identification of the relevant signal.

To take the local maximums into account, the invention provides—according to one preferred embodiment—that the system can measure a relative deviation ϵ* between the overall maximum H, and the average of two other best local maximums, denoted H' and H" as presented as an example in FIG. 7. Thus, if the best maximum clearly stands out from the other maximums, not only does the invention make it possible to characterize shared information between two regions, but additionally it eliminates some ambiguity as to the relevance of that characterization.

Within the meaning of the invention, $$\varepsilon^* = \frac{|H - \tilde{H}|}{2} \text{ where } \tilde{H} = \frac{H' + H''}{2}.$$

The closer the value of ϵ* is to 1, the more the presence of shared information between the two regions is proven.

To be able to take into account the second aforementioned constraint related to the imperfect localization of the sought signal, the invention provides a preferred mode for calculating ϵ*. According to this alternative, the signal is recomposed and distributed over several adjacent cells of the histogram to obtain the value H. FIG. 7 makes it possible to illustrate the notion of "mode" Ω, which consists of a grouping of five adjacent cells c1 to c5, the central cell c3 of which has a higher score than the other four cells.

The method according to the invention then consists of detecting all of the modes and ranking the latter by decreasing order out of the total score of the five cells making them up. The best mode (or that which obtains the best score) is linked to the relevant sought signal. To improve this discrimination, the invention provides that the processing unit of a system according to the invention calculates said score by adding the respective scores of the central cell with its left or right neighbor (the crosshatched cells c3, c2 or c4 according to FIG. 7). The score of the best mode thus developed is assigned the size H. The scores of the central cells of the other two best modes make it possible to obtain the values of H' and H".

The invention also provides, to guarantee the regularity of the histogram of the Hough space and thus facilitate the extraction of the modes, for optionally applying a low-pass filter to eliminate the unwanted artifacts while preserving the appearance of the histogram. Preferably, said filter is a median filter. Other filters may alternatively be used.

Figure 8:
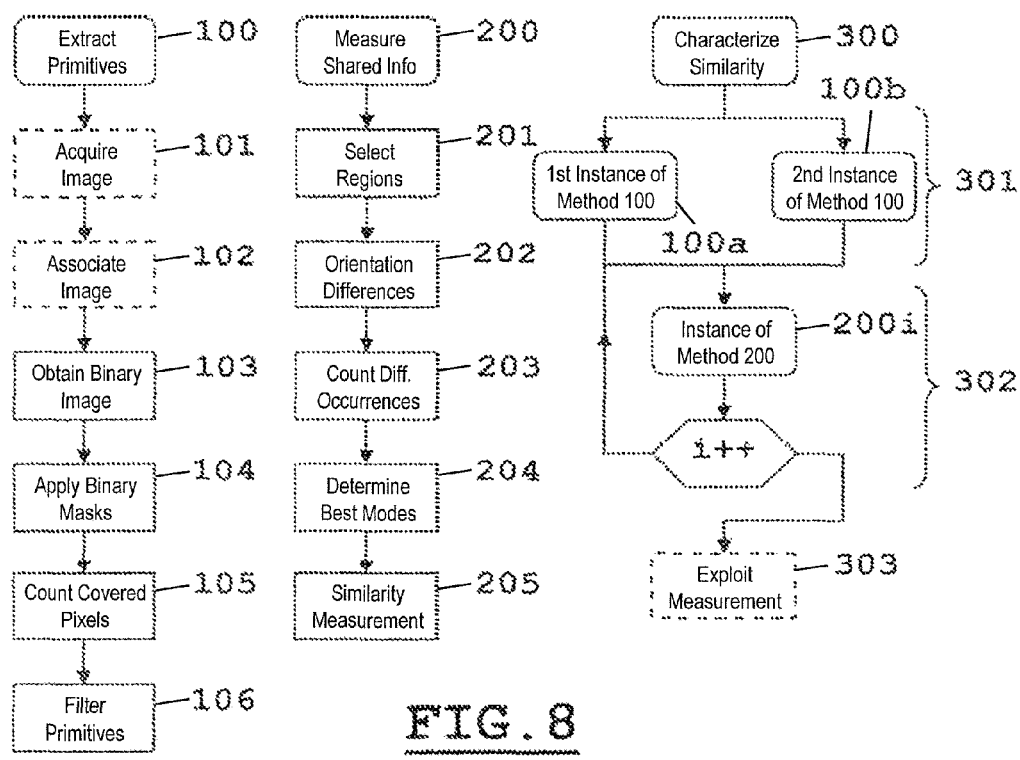
FIG. 8 shows a summary of the steps of a method according to the invention for measuring the similarity of two images.

FIG. 8 makes it possible to synthesize the main steps of a method 300 for characterizing a similarity between two binary images. Such a method 300 is carried out by the processing unit of an image analysis system according to the invention and adapted accordingly.

Such a method includes a first step 301 for extracting at least two sets of primitives Qa and Qb respectively associated with two binary images A and B associated with images of any modalities. This step results from the implementation of at least two instances 100a and 100b of a method 100 for extracting a set of primitives from a binary image as previously studied and which is further the subject-matter of a summary description below. The method 300 includes a step 302 for measuring the presence of shared information within the binary images A and B by counting the occurrences of differences of orientation of pairs of primitives respectively extracted from the two binary images. This step results from the iterative implementation of at least one instance 200i of a method 200 for measuring the presence of shared information within two binary images as previously studied and further being the subject-matter of a summary description below. Having one or more measurements of similarities between two images or regions resulting therefrom, the method 300 can include a step 303 aiming to exploit said at least one measurement. As an example, the step 303 may consist of recalibrating two images of possibly different modalities from which the binary images result and the similarity of which has been measured. This step may also consist of displaying said recalibrated images using a suitable man-machine interface of a system according to the invention. Alternatively, the step 303 may consist of identifying a landmark or a remarkable and precisely localized element in both images. Reciprocally, the "non-detection" of shared information may also be very important in certain applications: presence of a camp, or movable structures, etc. The similarity measurement 302 is then used to characterize 303 the absence of a sought structure.

To extract—100—the primitives from a binary image, a method according to the invention includes a first step 103 for obtaining a binary image in the form of a cloud of points. This binary image is stored beforehand by storage means of the system according to the invention, said storage means cooperating with the processing unit of said system implementing the method 300. The method 100 includes a step 104 consisting of applying a plurality of binary masks to each pixel making up the binary image. As previously studied, said binary masks may each consist of an orientation line whereof the thickness and orientation are predetermined and describing the diameter of a circular window whereof the radius is also predetermined. To extract the primitives, the method 100 includes a step 105 to:
- count, for each binary mask applied to a pixel, called referring pixel, the number of neighboring pixels of said referring pixels that are covered by said binary mask;
- define, as primitive of said referring pixel, a triplet comprising the position of the referring pixel in the binary image, the largest number of neighboring pixels covered by one of the applied binary masks, and the orientation of the orientation line of said binary mask.

Optionally and preferably, the method 100 includes a step 106 for refining the list of primitives extracted from a binary image, that list being obtained and stored by the storage means in 105.

Step 106 may consist of only keeping in memory the primitives whereof the number of neighboring pixels of a referring pixel and covered by a binary mask is greater than or equal to a predetermined minimum number $s_{min}$.

This step may alternatively or additionally consist of only keeping the primitives of referring pixels separated by a minimum and predetermined number $D_{min}$ of pixels.

Furthermore, the method 100 for extracting the primitives from a binary image may include a prior step 102 aiming to associate (therefore develop through the processing unit of the system according to the invention) said binary image with an image irrespective of its modality. This image may be acquired or selected from among several, for the implementation of capture means or a man-machine interface suitable for the system according to the invention.

The method 200 for measuring the presence of shared information within the two binary images in turn consists of a first step 201 in which the processing unit considers two regions respectively within the two binary images. This step may consist of an automatic and autonomous selection done by the processing unit or may result from the assistance of an operator using a man-machine interface suitable for the system. Alternatively, a region may encompass all of a binary image. Considering a region of the binary image amounts to selecting a subset of primitives. This selection is possible because a primitive—within the meaning of the invention—includes the coordinates of the referring point associated with said primitive.

The method 200 includes a step 202 in which the processing unit obtains the difference of the orientations of all of the pairs of primitives (one primitive being taken from the first region and the other from the second region).

In 203, the processing unit counts the occurrences of said differences. As an example, the step 203 may consist of filling out a one-dimensional table stored by the system. A distribution of the occurrences of the differences of orientation of the selected primitives is thus obtained as illustrated by FIG. 7, as an example.

A method 200 according to the invention further includes a step 204 in which the processing unit—for example by going through such a one-dimensional table—determines, according to one preferred embodiment, the three best modes H, H' and H" resulting from the distribution of the counted differences of orientation.

Lastly, in 205, the similarity measurement is developed by the processing unit by calculating and storing the similarity indicator $\epsilon^*$ according to the techniques previously studied, for example $$\varepsilon^* = \frac{|H - \tilde{H}|}{2} \text{ where } \tilde{H} = \frac{H' + H''}{2}.$$

The invention has been described through one preferred example embodiment (remote sensing) relative to the processing of images of different modalities of the radar or optical (multispectral) types. The invention may also be implemented to match other types of images: for example, satellite images for which one wishes to know the level of resemblance with airborne images of the "aerial photography" type.

The invention also applies to other fields including medical imaging, where the matching for example of images from scanners and MRI corresponding to different acquisitions in terms of densities for the former and hydrogen atom levels for the latter. It is also possible to implement the invention to measure the similarity between images of modalities other than ultrasonography (ultrasound imaging) or functional imaging.

Industrial vision and video protection are also fields for which the recalibration of multimodal images is sensitive. For example, quality control banks use several acquisition modalities to find defects. The invention is naturally relevantly applicable in these fields.

Irrespective of the multiple fields of application, it should be noted that the invention further produces excellent results in the particular case where the modalities of the images are identical. These are particularly relevant in the context of situations considered to be difficult such as, for example, when the lighting conditions of a scene evolve greatly from one shot to the next, for example in remote sensing or industrial vision.

The invention has been described through example applications for which a single binary image is associated with an image of a given modality. Said binary image is thus assumed to be the "best representative" of said image: a binary image resulting from a multispectral image may be obtained from the best recomposition of the bands φ thereof using a Principal Component Analysis method (i.e., recomposition associated with the Principal Direction). However, there may be interesting information to be exploited on the subsequent "Directions". In that case, it is no longer a single binary image that is produced, but multiple binary images. This is even more relevant if one uses "Independent Component Analysis" instead of using "Principal Component Analysis". This technique in fact causes the emergence not of a "recomposition" that best synthesizes the information contained in the different bands, but of several compositions, all of great importance and capable of revealing several aspects of overall information. Two images may thus respectively be associated with one or more binary images. The invention makes it possible to find information shared by the two initial images, by iteratively measuring the similarity of pairs of binary images formed from one of the binary images associated with the first image and one of the binary images associated with the second image. At the end, the invention makes it possible to determine the match maximizing the similarity measurement, for example.

Furthermore, the invention has preferably been described relative to a rigid transformation optionally made up of a scale factor (change of scale). The invention also applies to projective transformations (perspective, etc.) and complex transformations, i.e., continuously evolving transformations. This is in particular the case for airborne images (taken using airplanes, drones or airships) for which the relief (and therefore the variability of the altitude) plays a significant role in the recalibration transformation, this being different at various points of a same image. Nevertheless, this complex transformation may be locally approximated by a more elementary transformation. Thus, the invention makes it possible to associate enough landmarks to characterize not an overall transformation, but several local transformations that may then be "interpolated".

The invention claimed is:

1. A method for indicating a similarity between two binary images $A_a^i$, $A_b^j$, said method being carried out by a processing unit of a system for analyzing similarities of images further including a storage device cooperating with said processing unit to store binary images, wherein the method comprises:

a step for extracting a first set of primitives from a first binary image $A_a^i$ and a second set of primitives from a second binary image $A_b^j$, the first and second binary images being stored beforehand by the system, each primitive being associated with a pixel of a binary image and being characterized by the position of said pixel and by the orientation of an orientation line passing through the pixel;

a step for measuring the presence of a common piece of information within said binary images and delivering a similarity indicator ϵ* therefor, said indicator being calculated by the processing unit as the relative deviation between an overall maximum H and the average of two other local maximums H' and H", i.e., $$\varepsilon^* = \frac{|H - \tilde{H}|}{2} \text{ where } \tilde{H} = \frac{H' + H''}{2},$$

said maximums being determined from a distribution of the different orientations of pairs of primitives respectively resulting from two extracted sets of primitives.

2. The method according to claim 1, wherein the extraction step comprises:

obtaining a binary image $A_a^i$, $A_b^j$ stored by the system;

applying a plurality of binary masks to each pixel of said binary image $A_a^i$, $A_b^j$, the binary masks each consisting of including an orientation line whereof the thickness and orientation are predetermined and which describes a diameter of a circular window whereof the radius is also predetermined;

counting, for each binary mask applied to a pixel—called a referring pixel—, the number of pixels adjacent to said referring pixel that are covered by said binary mask;

defining, then storing as a primitive associated with a referring pixel, a triplet P((x,y)θ,s) comprising the position (x,y) of the referring pixel in the binary image; the largest number s, called the score, of adjacent pixels covered by one of the binary masks applied to the referring pixel; as well as the orientation θ of the orientation line of said binary mask.

3. The method according to claim 2, wherein a primitive is only stored if its score is greater than or equal to a predetermined minimum number.

4. The method according to claim 2, wherein only the primitives whereof the referring pixels are distant by a minimum and predetermined number of pixels are stored.

5. The method according to claim 1, wherein the measurement step carried out by the processing unit comprises:

determining a region of predetermined size in the first and second binary images to thus form a pair of regions $A_a^i$, $A_b^j$;

counting and storing the occurrences of the different orientations for all pairs of primitives respectively extracted from said pair of regions;

calculating the similarity indicator ϵ* between the two regions of the pair.

6. The method according to claim 5, further comprising a prior step for associating and storing said first and second binary images, respectively, with two images stored or acquired by the image similarity analysis system.

7. The method according to claim 6, further comprising a step for recalibrating two stored or acquired images or for identifying a remarkable element located in the two images from the calculated similarity indicator ϵ*.

8. The method according to claim 7, further comprising a step for displaying said recalibrated images and/or the remarkable element using a man-machine interface suitable for the image similarity analysis system.

9. A system for analyzing the similarity of binary images including a processing unit cooperating with a storage device, wherein said processing unit implements a method for indicating a similarity between two binary images according to claim 1.

10. A system for recalibrating images acquired or stored by a device for storing and/or acquiring an image, said device cooperating with a processing unit, which in turn further cooperates with a storage device, wherein said processing unit implements a method according to claim 6.

11. The system according to claim 10, wherein said processing unit delivers two recalibrated images or a remarkable element identified and localized in the two images to a man-machine interface.

12. The system according to claim 9, further including a man-machine interface for delivering the similarity indicator $\epsilon^*$.

13. The system according to claim 9, further including a man-machine interface for selecting one image from among several and/or a particular region thereof.

14. The system according to claim 10, wherein the acquisition device acquires images of different modalities.

\* \* \* \* \*